United States Patent
Kwon

(10) Patent No.: US 11,805,427 B2
(45) Date of Patent: Oct. 31, 2023

(54) METHOD AND APPARATUS FOR UTILIZING ALTITUDE INFORMATION OF MOBILE BASE STATION IN COMMUNICATION SYSTEM

(71) Applicant: ELECTRONICS AND TELECOMMUNICATIONS RESEARCH INSTITUTE, Daejeon (KR)

(72) Inventor: Yong Jin Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 181 days.

(21) Appl. No.: 17/518,399

(22) Filed: Nov. 3, 2021

(65) Prior Publication Data

US 2022/0150718 A1 May 12, 2022

(30) Foreign Application Priority Data

Nov. 6, 2020 (KR) .......... 10-2020-0148118
Oct. 15, 2021 (KR) .......... 10-2021-0137804

(51) Int. Cl.
*H04W 16/28* (2009.01)
*H04W 24/04* (2009.01)
*H04B 7/185* (2006.01)

(52) U.S. Cl.
CPC ........ *H04W 16/28* (2013.01); *H04B 7/18504* (2013.01); *H04W 24/04* (2013.01)

(58) Field of Classification Search
CPC ..... H04W 16/28; H04W 24/04; H04W 4/025; H04W 4/44; H04B 7/18504; B64U 2201/20; G08G 5/0013; G08G 5/0052; G08G 5/0069
See application file for complete search history.

(56) References Cited

U.S. PATENT DOCUMENTS

| | | | |
|---|---|---|---|
| 9,386,484 B2 | 7/2016 | Jeong et al. | |
| 10,667,182 B2 | 5/2020 | Xu et al. | |
| 2012/0231727 A1 | 9/2012 | Nagata et al. | |
| 2014/0162652 A1 | 6/2014 | Kang et al. | |
| 2016/0371985 A1 | 12/2016 | Kotecha | |
| 2017/0029107 A1* | 2/2017 | Emami | G08G 5/0069 |
| 2020/0178135 A1 | 6/2020 | Yun et al. | |
| 2020/0288390 A1 | 9/2020 | Wang et al. | |
| 2021/0343154 A1* | 11/2021 | Faccin | G08G 5/0008 |
| 2022/0020276 A1* | 1/2022 | Natiuk | G08G 5/0069 |

FOREIGN PATENT DOCUMENTS

KR  10-2166916 B1  10/2020
WO  2019/135368 A1  7/2019

OTHER PUBLICATIONS

G. Geraci et al., "Understanding UAV Cellular Communications: From Existing Networks to Massive MIMO," IEEE Access, vol. 6, pp. 67853-67865, Nov. 9, 2018.

* cited by examiner

*Primary Examiner* — Ashley Shivers
(74) *Attorney, Agent, or Firm* — Rabin & Berdo, P.C.

(57) ABSTRACT

An operation method performed by a mobile base station in a communication system may comprise: obtaining altitude information; configuring altitude indicator information indicating whether the obtained altitude information is higher or lower than an altitude reference in cooperation with a drone management device based on the obtained altitude information; and transmitting the configured altitude indicator information to a terminal.

12 Claims, 14 Drawing Sheets

METHOD AND APPARATUS FOR UTILIZING ALTITUDE INFORMATION OF MOBILE BASE STATION IN COMMUNICATION SYSTEM

CROSS-REFERENCE TO RELATED APPLICATIONS

This application claims priority to Korean Patent Applications No. 10-2020-0148118, filed on Nov. 6, 2020, and No. 10-2021-0137804, filed on Oct. 15, 2021 with the Korean Intellectual Property Office (KIPO), the entire contents of which are hereby incorporated by reference.

BACKGROUND

1. Technical Field

The present disclosure relates to a technique for utilizing altitude information of a mobile base station in a communication system, and more particularly, to a technique for a terminal to utilize altitude information of a mobile base station in a communication system.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In order to process wireless data that increases rapidly after commercialization of the fourth generation (4G) communication system (e.g., long term evolution (LTE) communication system or LTE-Advanced (LTE-A) communication system), a fifth generation (5G) communication system (e.g., new radio (NR) communication system) using not only a frequency band (e.g., frequency band of 6 GHz or below) of the 4G communication system but also a frequency band (e.g., frequency band of 6 GHz or above) higher than the frequency band of the 4G communication system is being considered. The 5G communication system may support enhanced Mobile BroadBand (eMBB), Ultra-Reliable and Low Latency Communication (URLLC), and massive Machine Type Communication (mMTC).

In such the communication systems, drone-based aerial vehicles are commercially valuable because of their ease of deployment in case of disaster monitoring, border surveillance, emergency assistance, or the like, low purchase and maintenance costs, mobility, and ability to stay in the air. In particular, an aerial vehicle equipped with a flying base station may be able to be quickly put into operations, and may provide a wide communication coverage. Further, an aerial vehicle equipped with a flying base station may be applicable to scenarios such as disaster and emergency situations and provision of a temporary coverage to mobile communication users in traffic-dense areas. A communication channel characteristic and a cell coverage for such the aerial vehicle equipped with a flying base station may vary according to an altitude thereof. Accordingly, there may be a need for techniques that enable a terminal to take advantage of the altitude-dependent characteristics of the aerial vehicle equipped with a flying base station.

SUMMARY

Accordingly, exemplary embodiments of the present disclosure are directed to providing methods and apparatuses for utilizing altitude information of a mobile base station in a communication system, which improve the communication performance of terminals through utilization of the altitude information of the mobile base station.

According to a first exemplary embodiment of the present disclosure, an operation method, performed by a mobile base station in a communication system, may comprise: obtaining altitude information; configuring altitude indicator information indicating whether the obtained altitude information is higher or lower than an altitude reference in cooperation with a drone management device based on the obtained altitude information; and transmitting the configured altitude indicator information to a terminal.

The configuring of the altitude indicator information may comprise: requesting the altitude reference from the drone management device; receiving the altitude reference from the drone management device; and configuring the altitude indicator information by comparing the altitude information with the received altitude reference.

The configuring of the altitude indicator information may comprise: transmitting an altitude indicator information request signal including the altitude information to the drone management device; and receiving the altitude indicator information from the drone management device.

The operation method may further comprise: receiving a target altitude from the drone management device; moving to meet the target altitude; changing the altitude indicator information according to the target altitude; and transmitting the changed altitude indicator information to the terminal.

The changing of the altitude indicator information may comprise: determining whether a position of the mobile base station is changed above or below the altitude reference according to the moving to meet the target altitude; and changing the altitude indicator information when the position of the mobile base station is changed above or below the altitude reference.

According to a second exemplary embodiment of the present disclosure, an operation method, performed by a terminal in a communication system, may comprise: receiving first altitude indicator information from a first mobile base station; receiving second altitude indicator information from a second mobile base station; identifying a first altitude of the first mobile base station based on the first altitude indicator information; identifying a second altitude of the second mobile base station based on the second altitude indicator information; selecting one mobile base station among the first mobile base station and the second mobile base station based on the first altitude and the second altitude; and performing an operation for accessing the one mobile base station.

The first altitude indicator information may indicate whether the first altitude is higher or lower than the altitude reference, and the second altitude indicator information may indicate whether the second altitude is higher or lower than the altitude reference.

The selecting of the one mobile base station may comprise: identifying a set altitude preference; selecting an altitude corresponding to the set altitude preference from among the first altitude and the second altitude; and selecting the one mobile base station corresponding to the selected altitude.

The selecting of the one mobile base station may comprise: predicting an expected movement range using a movement history of the terminal, position information of the terminal, and information on mobile base stations that the terminal has previously accessed; selecting an altitude corresponding to the predicted expected movement range from among the first altitude and the second altitude; and selecting the one mobile base station corresponding to the selected altitude.

According to a third exemplary embodiment of the present disclosure, a terminal may comprise: a processor; a memory electronically communicating with the processor; and instructions stored in the memory, wherein when executed by the processor, the instructions cause the terminal to: receive first altitude indicator information from a first mobile base station; receive second altitude indicator information from a second mobile base station; identify a first altitude of the first mobile base station based on the first altitude indicator information; identify a second altitude of the second mobile base station based on the second altitude indicator information; select one mobile base station among the first mobile base station and the second mobile base station based on the first altitude and the second altitude; and perform an operation for accessing the one mobile base station.

In the selecting of the one mobile base station, the instructions may cause the terminal to: identify a set altitude preference; select an altitude corresponding to the set altitude preference from among the first altitude and the second altitude; and select the one mobile base station corresponding to the selected altitude.

In the selecting of the one mobile base station, the instructions may cause the terminal to: predict an expected movement range using a movement history of the terminal, position information of the terminal, and information on mobile base stations that the terminal has previously accessed; select an altitude corresponding to the predicted expected movement range from among the first altitude and the second altitude; and select the one mobile base station corresponding to the selected altitude.

According to the exemplary embodiments of the present disclosure, mobile base stations may inform terminals of altitude information thereof by using altitude indicators. Also, when the altitude is changed, each of the mobile base stations may inform the terminals of the changed altitude information according to the changed altitude. In addition, the terminals may receive the altitude indicators from the mobile base stations to determine the altitude information of the mobile base stations. Also, the terminals may perform a cell selection operation suitable for a communication service environment by using the identified altitude information of the mobile base stations. Further, the terminals can use communication services by selecting a cell suitable for the communication service environment, thereby improving network performance. Also, since the terminals can use communication service by selecting a cell suitable for a predicted path, reliable use of the communication services can be possible.

DETAILED DESCRIPTION OF THE EMBODIMENTS

Figure 1:
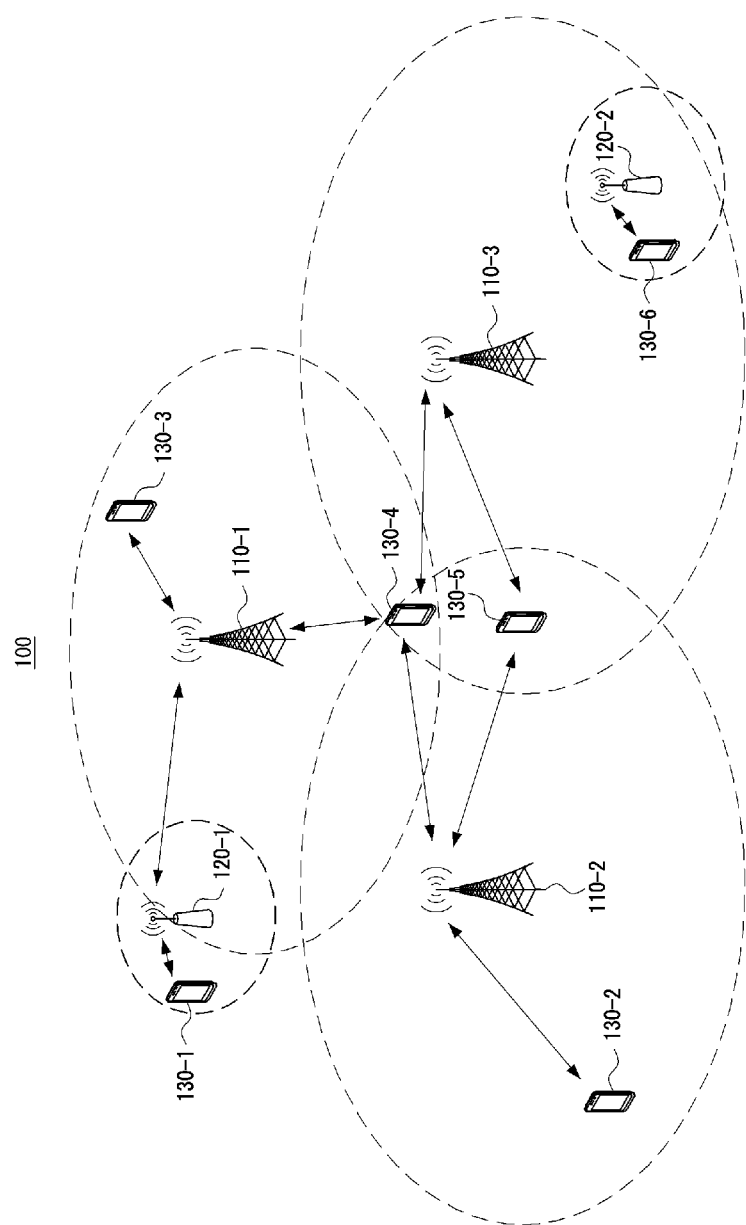
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
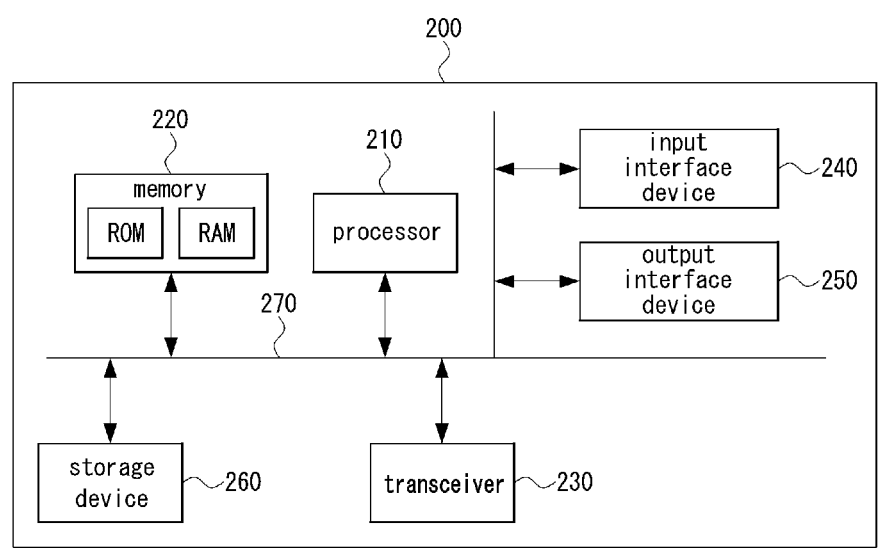
FIG. 2 is a block diagram illustrating a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Research and development on broadband mobile communications in such the communication system have developed by focusing on terminal users at ground level outdoors and terminal users indoors, such as inside buildings. In particular, in recent years, the research and development on broadband mobile communications are being progressed to provide methods of providing a communication connection to an aerial vehicle flying relatively high compared to antenna positions of the existing terminals and base stations.

Figure 3:
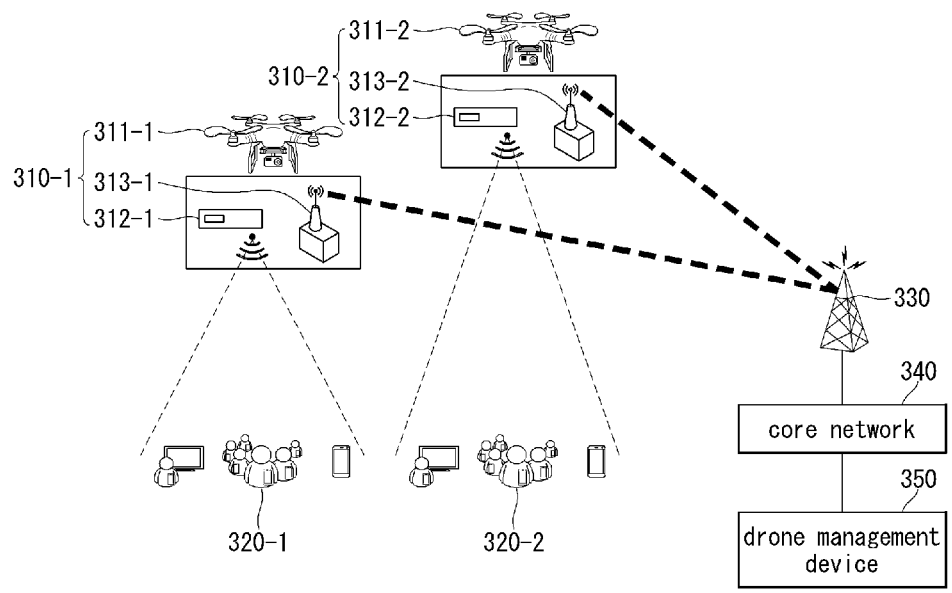
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a plurality of mobile base stations 310-1 and 310-2, terminals 320-1, terminals 320-2, a mobile backhaul hub 330, a core network 340, and a drone management device 350. Here, each of the plurality of mobile base stations 310-1 and 310-2 may be equipped with an aerial vehicle 311-1 or 311-2, flying base station 312-1 or 312-2, or mobile backhaul terminal 313-1 or 313-2. Here, the aerial vehicles 311-1 and 311-2 may perform operations such as physical movement and position control in the air. In addition, the flying base stations 312-1 and 312-2 may provide communication services to the terminals 320-1 and 320-2 included in respective communication cell coverages through radio connections. In addition, the mobile backhaul terminals 313-1 and 313-2 may be connected to the core network 340 and the drone management device 350 through radio connections with the mobile backhaul hub 330.

As described above, the mobile backhaul terminals 313-1 and 313-2 may form a backhaul network together with the mobile backhaul hub 330, the core network 340, and the like. In addition, the mobile backhaul terminals 313-1 and 313-2 and the mobile backhaul hub 330 may configure mobile backhaul links connecting the flying base stations 312-1 and 312-2 and the core network 340. As described above, the plurality of mobile base stations 310-1 and 310-2 may exist in the communication system to provide communication services to the terminals 320-1 and 320-2.

Meanwhile, 3GPP, the representative cellular international standardization organization, is in the process of standardizing to add unmanned aerial vehicles to a cellular system. The 3GPP have added functions in release 15, such as techniques for mitigating downlink and uplink interferences due to unmanned aerial vehicles, based on the existing LTE network.

The mobile base stations 310-1 and 310-2 may be located at a higher altitude (i.e., $h_{UT}$) compared to the antenna heights of the terminals 320-1 and 320-2 or terrestrial base stations. In this case, a line-of-sight (LOS) environment between the mobile base stations 310-1 and 310-2 and the terminals 320-1 and 320-2 may be satisfied with a high LOS probability. With reference to the 3GPP channel model documents, the LOS probability (i.e., $P_{LOS}$) considering the altitudes of the aerial vehicles 311-1 and 311-2 may be expressed in Equations 1 and 2. When the heights (i.e., $h_{UT}$) of the aerial vehicles 311-1 and 311-2 have a height of 100 meters or more and 300 meters or less, the LOS probability may be 1, and they may always have a LOS environment.

Figure 4:
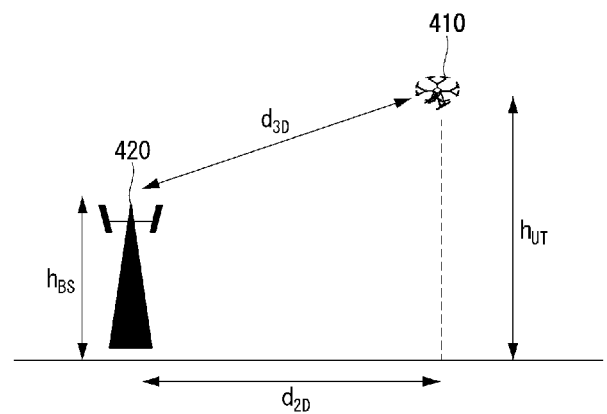
FIG. 4 is a conceptual diagram illustrating a first exemplary embodiment of a positional relationship between a terrestrial base station and an aerial vehicle.

In addition, when the heights of the aerial vehicles 311-1 and 311-2 have a height of 1.5 meters or more and 22.5 meters or less, the LOS probability may follow Equation 1. When the heights of the aerial vehicles 311-1 and 311-2 have a height of 22.5 meters or more and 100 meters or less, the LOS probability may follow Equation 2. Here, $d_{2D}$ may denote a distance between the aerial vehicle 311-1 or 311-2 and the terrestrial base station on two-dimensional coordinates not considering the heights of the aerial vehicle 311-1 or 311-2 and the terrestrial base station.

$$P_{LOS} = \begin{cases} 1, & d_{2d} \leq 18m \\ \left[\dfrac{18}{d_{2D-out}} + \exp\left(\dfrac{-d_{2D}}{63}\right)\left(1 - \dfrac{18}{d_{2D-out}}\right)\right]\left(1 + C'(h_{UT})\dfrac{5}{4}\left(\dfrac{d_{2D-out}}{100}\right)^3 \exp\left(\dfrac{-d_{2D}}{150}\right)\right), & d_{2D} > 18m \end{cases}$$ [Equation 1]

Where $$C'(h_{UT}) = \begin{cases} 0, & h_{UT} \leq 13m \\ \left(\dfrac{h_{UT} - 13}{10}\right)^{1.5}, & 13m < h_{UT} \leq 23m \end{cases}$$

$$P_{LOS} = \begin{cases} 1, & d_{2D} \leq d_1 \\ \dfrac{d_1}{d_{2D}} + \exp\left(\dfrac{-d_{2D}}{p1}\right)\left(1 - \dfrac{d_1}{d_{2D}}\right), & d_{2D} > d_1 \end{cases}$$ [Equation 2]

Where $p_1 = 4300 * \log_{10}(h_{UT}) - 3800$ $d_1 = \max(460 * \log_{10}(h_{UT}) - 700, 18)$ FIG. 4 is a conceptual diagram illustrating a first exemplary embodiment of a positional relationship between a terrestrial base station and an aerial vehicle.

Referring to FIG. 4, an altitude of an aerial vehicle 410 may be $h_{UT}$. A distance between the aerial vehicle 410 and a terrestrial base station 420 on two-dimensional coordinates not considering the heights of the aerial vehicle 410 and the terrestrial base station 420 may be $d_{2D}$ or $dis_{2D}$. Also, the distance between the aerial vehicle 410 and the terrestrial base station 420 on the three-dimensional coordinates may be $d_{3D}$ or $dis_{3D}$. The height of the terrestrial base station 420 may be $h_{BS}$.

Figure 5:
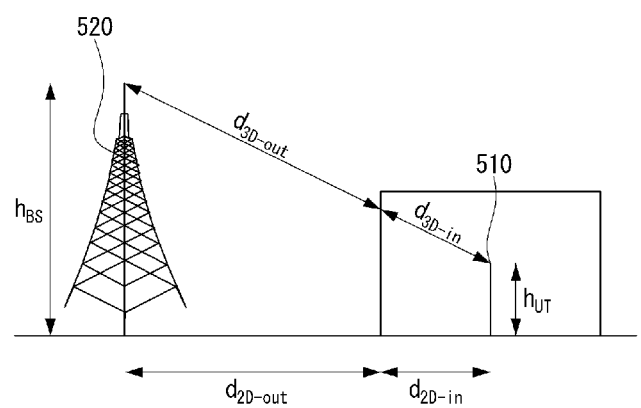
FIG. 5 is a conceptual diagram illustrating a second exemplary embodiment of a positional relationship between a terrestrial base station and an aerial vehicle.

FIG. 5 is a conceptual diagram illustrating a second exemplary embodiment of a positional relationship between a terrestrial base station and an aerial vehicle.

Referring to FIG. 5, a distance corresponding to the outdoor, in the distance between an aerial vehicle 510 and a terrestrial base station 520 on the two-dimensional coordinates excluding the heights thereof, may be $d_{2D-OUT}$. A distance corresponding to the indoor, in the distance between the aerial vehicle 510 and the terrestrial base station 520 on the two-dimensional coordinates excluding the heights thereof, may be $d_{2D-IN}$. A distance corresponding to the outdoor, in the distance between the aerial vehicle 510 and the terrestrial base station 520 on the three-dimensional coordinates, may be $d_{3D-OUT}$. A distance corresponding to the indoor, in the distance between the aerial vehicle 510 and the terrestrial base station 520 on the three-dimensional coordinates, may be $d_{3D-IN}$.

On the other hand, if a distance between a terminal and a flying base station is not close enough at a low height of the aerial vehicle, a non-LOS (NLOS) environment may occur. Referring to the 3GPP channel model documents, a path loss (i.e., $PL_{UMa\text{-}AV\text{-}LOS}$) in the LOS environment in consideration of the altitude of the aerial vehicle may be summarized as Equations 3 and 4 below. If the altitude of the aerial vehicle is greater than or equal to 1.5 meters and less than or equal to 22.5 meters, the path loss in the LOS environment may follow Equation 3.

In addition, if the altitude of the aerial vehicle is 22.5 meters or more and 300 meters or less, and $dis_{2D}$ is 4 Km or less, the path loss in the LOS environment may follow Equation 4. Here, fc may have a unit of GHz as a frequency band of a radio channel used. $h_E$ may mean the height of the surrounding environment. For example, in an urban environment, $h_E$ may be 1 meter. c may be the speed of light in free space.

$$PL_{UMa-LOS} = \begin{cases} PL_1, & 10m \leq dis_{2D} \leq d'_{BP} \\ PL_2, & d'_{BP} \leq dis_{2D} \leq 5km \end{cases}$$ [Equation 3]

Where $PL_1 = 28.0 + 22\log_{10}(dis_{3D}) + 20\log_{10}(f_c)$ $PL_2 = 28.0 + 40\log_{10}(dis_{3D}) +$
$\qquad 20\log_{10}(f_c) - 9\log_{10}((d'_{BP})^2 + (h_{BS} - h_{UT})^2)$ $d'_{BP} = 4(h_{UT} - h_E)(h_{BS} - h_E)f_c/c$ $PL_{UMa-AV-LOS} = 28.0 + 22\log_{10}(dis_{3D}) + 20\log_{10}(f_c)$ [Equation 4]

The path loss $PL_{UMa\text{-}AV\text{-}NLOS}$ in the NLOS environment considering the height of the aerial vehicle may be summarized as Equations 5 and 6. If the altitude of the aerial vehicle is 1.5 meters or more and 22.5 meters or less, the path loss in the NLOS environment may follow Equation 5. In addition, if the altitude of the aerial vehicle is 22.5 meters or more and 100 meters or less, and $dis_{2D}$ is 4 Km or less, the path loss in the NLOS environment may follow Equation 6.

Figure 6:
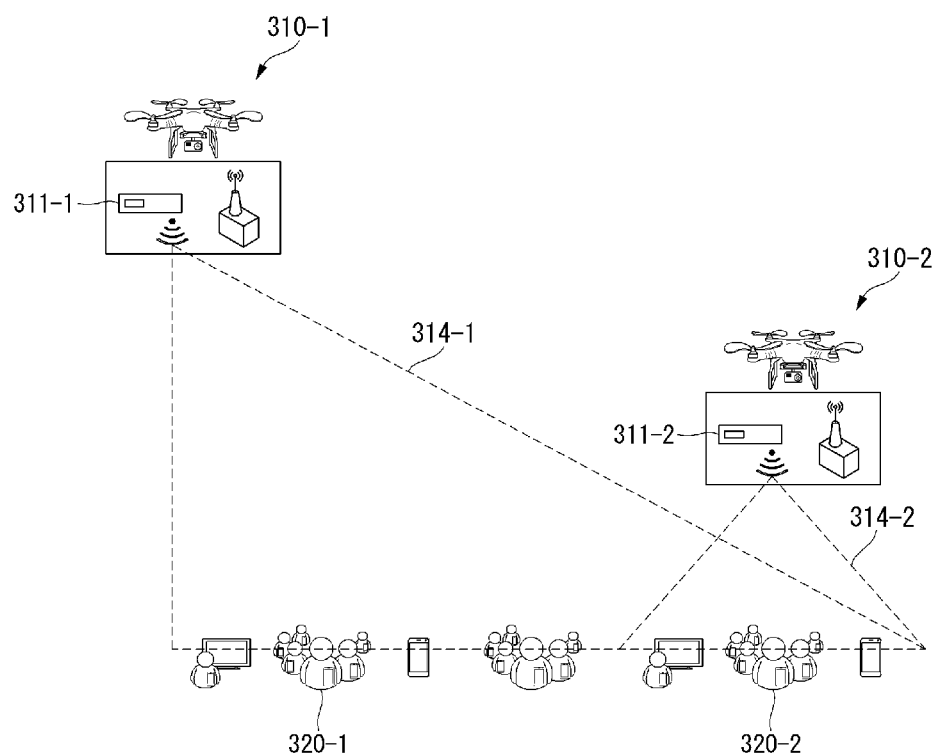
FIG. 6 is a conceptual diagram illustrating a first exemplary embodiment of a cell coverage according to an altitude of a mobile base station.

$P_{UMa-NLOS} = \max(PL_{UMa-LOS}, PL'_{UMa-NLOS})$ [Equation 5]

Where $PL'_{UMa-NLOS} =$
$\qquad 13.54 + 39.08\log_{10}(dis_{3D}) + 20\log_{10}(f_c) - 0.6(h_{UT} - 1.5)$ $PL_{UMa-AV-NLOS} =$ [Equation 6]
$\qquad -17.5 + (46 - 7\log_{10}(h_{UT}))\log_{10}(dis_{3D}) + 20\log_{10}\left(\dfrac{40\pi f_c}{3}\right)$ FIG. 6 is a conceptual diagram illustrating a first exemplary embodiment of a cell coverage according to an altitude of a mobile base station.

Referring to FIG. 6, the altitude of the first mobile base station 310-1 may be higher than that of the second mobile base station 310-2. Accordingly, a first cell coverage 314-1 covered by the first flying base station 311-1 of the first mobile base station 310-1 may be wider than that a second cell coverage 314-2 covered by the second flying base station 311-2 of the second mobile base station 310-2. The first mobile base station 310-1 located at a higher altitude may have a large average path loss due to a distance difference, but may have the wider first cell coverage 314-1 due to the LOS environment having a high LOS probability.

As a result, the first flying base station 311-1 of the first mobile base station 310-1 may provide communication services to the first terminals 320-1 and the second terminals 320-2. On the other hand, the second cell coverage 314-2 covered by the second flying base station 311-2 of the second mobile base station 310-2 may be narrower than the first cell coverage 314-1 covered by the first flying base station 311-1 of the first mobile base station 310-1. As such, the second mobile base station 310-2 located at a relatively lower altitude may provide a high transmission rate to the second terminals 320-2 located at a close distance in the LOS environment. However, the second mobile base station 310-2 may have the relatively narrower second cell coverage 314-2 as the distance from the second terminals 320-2 increases, the NLOS environment frequently occurs, and the path loss increases. The second flying base station 311-2 of the second mobile base station 310-2 may provide communication services to the second terminals 320-2.

Accordingly, the present disclosure proposes a method for improving the communication performance of the terminal in an environment of utilizing mobile base stations in the cellular communication system. Specifically, the present disclosure proposes a classification method according to the altitude of the mobile base station providing communication services. In addition, the present disclosure may propose a method for improving the network performance in an arbitrary situation such as a disaster situation by introducing a selective access method using the same.

Figure 7:
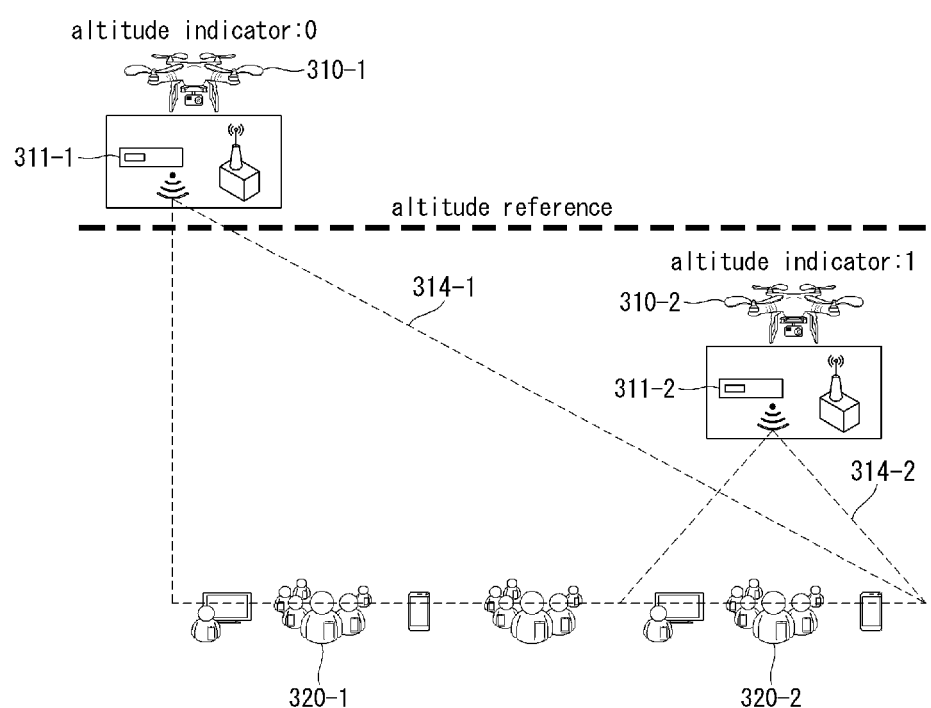
FIG. 7 is a conceptual diagram illustrating a first exemplary embodiment of an altitude indicator according to an altitude of a mobile base station.

FIG. 7 is a conceptual diagram illustrating a first exemplary embodiment of an altitude indicator according to an altitude of a mobile base station.

Referring to FIG. 7, the altitude of the first mobile base station 310-1 may be higher than an altitude reference. Here, the altitude reference may be 22.5 meters or 100 meters at which the LOS probability of the radio channel between the first mobile base station 310-1 and the terminals 320-1 and 320-2 changes. Accordingly, the first mobile base station 310-1 may identify its own altitude, and if the identified altitude is equal to or greater than the altitude reference, the first mobile base station 310-1 may set an altitude indicator thereof to a first value (e.g., 0). On the other hand, the altitude of the second mobile base station 310-2 may be lower than the altitude reference. Accordingly, the second mobile base station 310-2 may identify its own altitude, and if the identified altitude is less than the altitude reference, the second mobile base station 310-2 may set the altitude indicator to a second value (e.g., 1).

Here, the altitude indicator may be an indicator indicating whether each of the altitudes of the mobile base stations 310-1 and 310-2 is higher or lower than the altitude reference. The altitude indicator set to 0 may refer to a case where the altitude is equal to or greater than the altitude reference, and the altitude indicator set to 1 may refer to a case where the altitude is less than the altitude reference. Information on the altitude indicators of the mobile base stations 310-1 and 310-2 may be transmitted to the terminals 320-1 and 320-2 in various manners. For example, each of the mobile base stations 310-1 and 310-2 may include the altitude indicator in a system information block (SIB) used when transmitting system information to the terminals 320-1 and 320-2.

Accordingly, the terminals 320-1 and 320-2 may receive the information on the altitude indicators from the mobile base stations 310-1 and 310-2. In addition, the terminals 320-1 and 320-2 may utilize the received altitude indicator information according to services required by them in a cell selection procedure. Such the utilization of the altitude indicators by the terminals 320-1 and 320-2 may be performed in a procedure of initially selecting a cell to access or in a procedure of handover to change an access base station.

Here, the altitude reference for the mobile base stations 310-1 and 310-2 to set the altitude indicators thereof may be set in the mobile base stations 310-1 and 310-2 by a communication service provider based on the channel environment. Accordingly, the mobile base stations 310-1 and 310-2 may set their altitude indicators by using the preset altitude reference. Alternatively, the drone management device may set the altitude reference according to operation situations of the mobile base stations 310-1 and 310-2 and information stored in advance. In addition, the drone management device may deliver the set altitude reference to the mobile base stations 310-1 and 310-2. Accordingly, the mobile base stations 310-1 and 310-2 may receive the set altitude reference from the drone management device, and store and use the set altitude reference.

On the other hand, in addition to the method in which the mobile base stations 310-1 and 310-2 simply use one altitude reference, it may be possible to use a plurality of altitude indicators by using a plurality of altitude references. For example, if 22.5 meters and 100 meters are used as the plurality of altitude references, the mobile base station located at an altitude of less than 22.5 meters may use an indicator set to '00'. In addition, if 22.5 meters and 100 meters are used as the plurality of altitude references, the mobile base station located at an altitude of 22.5 meters or more and less than 100 meter may use an indicator set to '01'. In addition, if 22.5 meters and 100 meters are used as the plurality of altitude references, the mobile base station located at an altitude of 100 meters or more may use an indicator set to '10'. In the present disclosure, for convenience of explanation, the description may be focused on an example of setting an altitude indicator using a single altitude reference.

When the mobile base stations 310-1 and 310-2 are classified using the altitude indicators as described above, the terminals 320-1 and 320-2 may use the altitude indicator information in the cell selection procedure according to a required service. For example, since the first mobile base station 310-1 having a higher altitude has the wider first cell coverage 314-1, it may be suitable for terminals with high mobility. As an example, the first mobile base station 310-1 having a higher altitude may be utilized for terminals carried by patrol members who should continuously patrol a wide area such as a hillside at a high speed. On the other hand, as described above, the mobile base stations 310-1 and 310-2 may request the altitude reference from the drone management device 350, and receive the altitude reference from the drone management device 350. In addition, each of the mobile base stations 310-1 and 310-2 may set its altitude indicator to indicate an altitude higher than the altitude reference if its current altitude is higher than the altitude reference based on the received altitude reference, and the altitude indicator may be set to 0. In addition, each of the mobile base stations 310-1 and 310-2 may set its altitude indicator to indicate an altitude lower than the altitude reference if its current altitude is lower than the altitude reference based on the received altitude reference, and the altitude indicator may be set to 1. In this manner, the mobile base stations 310-1 and 310-2 may receive the altitude reference from the drone management device 350, and set their altitude indicators. However, unlike this, the mobile base stations 310-1 and 310-2 may transmit information on their altitudes to the drone management device 350, and receive altitude indicators thereof set by the drone management device 350 from the drone management device 350.

Figure 8:
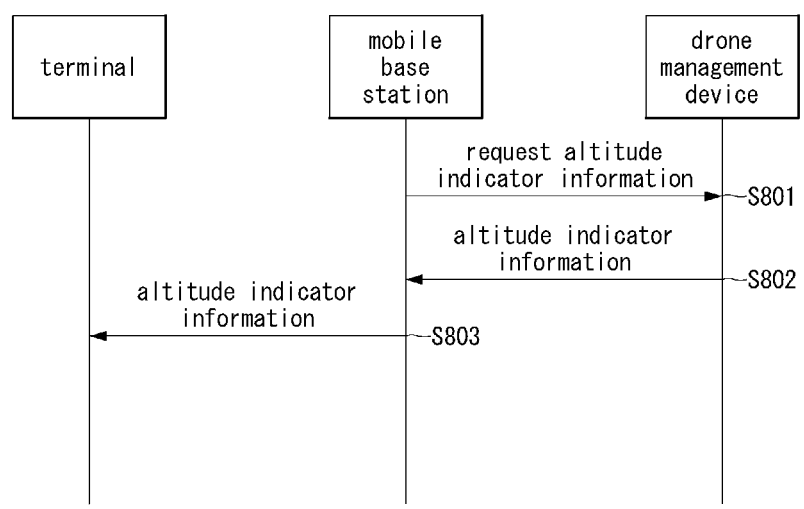
FIG. 8 is a sequence chart illustrating a first exemplary embodiment of a procedure of setting an altitude indicator.

FIG. 8 is a sequence chart illustrating a first exemplary embodiment of a procedure of setting an altitude indicator.

Referring to FIG. 8, in a procedure of setting an altitude indicator, the mobile base station may move to a position where a required operation is to be performed, and request altitude indicator information from the drone management device by transmitting coordinate information of the corresponding position including altitude information to the drone management device (S801). Then, the drone management device may set the altitude indicator of the mobile base station according to a predetermined altitude reference, and may transmit information on the set altitude indicator to the mobile base station (S802). Accordingly, the mobile base station may continuously transmit the altitude indicator information to the terminal while performing operations as a base station at the corresponding position (S803). The mobile base station may transmit the altitude indicator information to the terminal through at least one of radio resource control (RRC) message, medium access control (MAC) control element (CE), or downlink control information (DCI).

Figure 9:
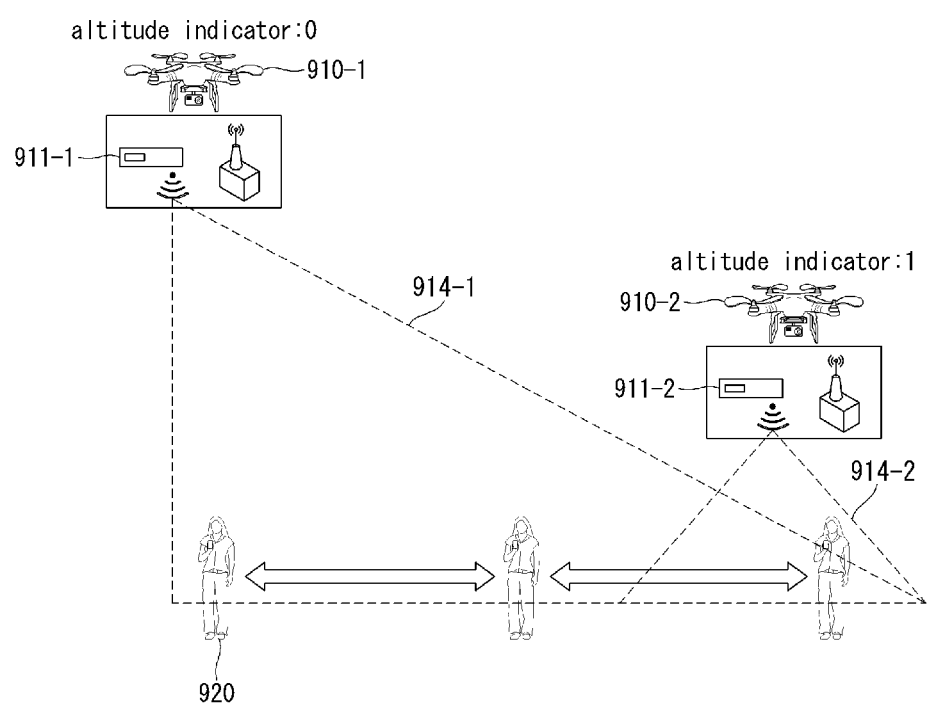
FIG. 9 is a conceptual diagram illustrating a first exemplary embodiment of a procedure for a terminal to select a mobile base station by using an altitude indicator.

FIG. 9 is a conceptual diagram illustrating a first exemplary embodiment of a procedure for a terminal to select a mobile base station by using an altitude indicator.

Referring to FIG. 9, a first mobile base station 910-1 may be located at a higher altitude, and may transmit to a terminal 920 an altitude indicator set to 0. Then, the terminal 920 may receive the altitude indicator set to 0 from the first mobile base station 910-1. Accordingly, the terminal 920 may identify the altitude indicator, may identify that the altitude of the first mobile base station 910-1 is higher than the altitude reference because the altitude indicator is set to 0, and may identify that the first mobile base station 910-1 has a wide first cell coverage 914-1.

On the other hand, a second mobile base station 910-2 may be located at a lower altitude, and may transmit to the terminal 920 an altitude indicator set to 1. Accordingly, the terminal 920 may identify the altitude indicator, may identify that the altitude of the second mobile base station 910-2 is lower than the altitude reference because the altitude indicator is set to 1, and may identify that the second mobile base station 910-2 has a second cell coverage 914-2 narrower than has the first cell coverage 914-1.

As described above, the terminal 920 may identify the altitudes of the first mobile base station 910-1 and the second mobile base station 910-2, and may determine that the altitude of the first mobile base station 910-1 is higher than the altitude of the second mobile base station 910-2. Then, the terminal 920 may determine its own position and movement speed, select a mobile base station to be accessed from among the first mobile base station 910-1 and the second mobile base station 910-1 based on the identified position and movement speed, and perform a procedure for accessing the selected mobile base station. For example, if the terminal 910 is located within a certain radius from a center of the first cell coverage 914-1 of the first mobile base station 910-1, and the movement speed of the terminal 910 is 3 kilometers or more per hour, the first mobile base station 910-1 may be selected as a mobile base station to be accessed. In addition, the terminal 910 may access the first mobile base station 910-1 to use communication services. In such the situation, the terminal 910 may receive high-quality communication services from the first mobile base station 910-1.

Figure 10:
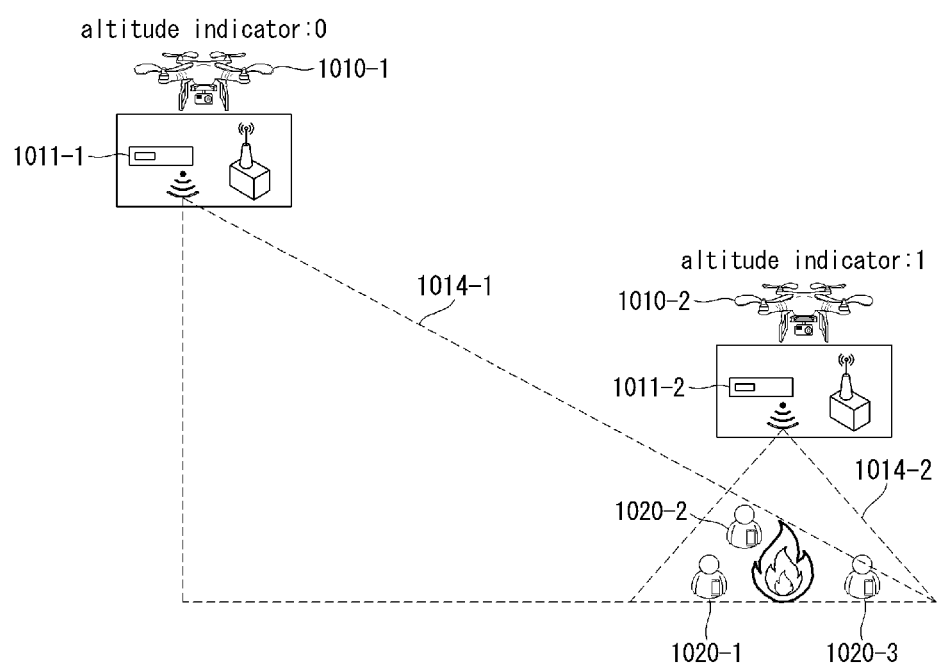
FIG. 10 is a conceptual diagram illustrating a second exemplary embodiment of a procedure for a terminal to select a mobile base station by using an altitude indicator.

FIG. 10 is a conceptual diagram illustrating a second exemplary embodiment of a procedure for a terminal to select a mobile base station by using an altitude indicator.

Referring to FIG. 10, a first mobile base station 1010-1 may be located at a higher altitude, and may transmit to terminals 1020-1 to 1020-3 an altitude indicator set to 0. Then, the terminals 1020-1 to 1020-3 may receive the altitude indicator set to 0 from the first mobile base station 1010-1. Accordingly, the terminals 1020-1 to 1020-3 may identify the altitude indicator, may identify that the altitude of the first mobile base station 1010-1 is higher than the altitude reference because the altitude indicator is set to 0, and may identify that the first mobile base station 1010-1 has a wide first cell coverage 1014-1.

On the other hand, a second mobile base station 1010-2 may be located at a lower altitude than the first mobile base station 1010-1, and since the altitude is lower than the altitude reference, the second mobile base station 1010-2 may transmit to the terminals 1020-1 to 1020-3 an altitude indicator set to 1. Accordingly, the terminals 1020-1 to 1020-3 may identify the altitude indicator, may identify that the altitude of the second mobile base station 1010-2 is lower than the altitude reference because the altitude indicator is set to 1, and may identify that the second mobile base station 1010-2 has a second cell coverage 1014-2 narrower than has the first cell coverage 1014-1. As described above, the terminals 1020-1 to 1020-3 may identify the altitudes of the first mobile base station 1010-1 and the second mobile base station 1010-2, and may determine that the altitude of the first mobile base station 1010-1 is higher than the altitude of the second mobile base station 1010-2.

For example, the first terminals 1020-1 to 1010-3 may be carried by users in disaster areas located in the first cell coverage 1014-1 and the second cell coverage 1014-2. Accordingly, the terminals 1020-1 to 1020-3 may have a slow movement speed as their users perform disaster rescue operations in the disaster area. For example, when identified positions of the terminals 1020-1 to 1020-3 are in an area where the first cell coverage 1014-1 and the second cell coverage 1014-2 overlap each other, the terminals 1020-1 to 1020-3 may have a movement speed of 3 kilometers or less per hour, and the second mobile base station 1010-2 may be selected as a mobile base station to be accessed. Then, the terminals 1020-1 to 1020-3 may access the second mobile base station 1010-2, and use communication services of the second mobile base station 1010-2. In such the situation, the terminals 1020-1 to 1020-3 may receive high-quality communication services from the second mobile base station 1010-2.

Figure 11:
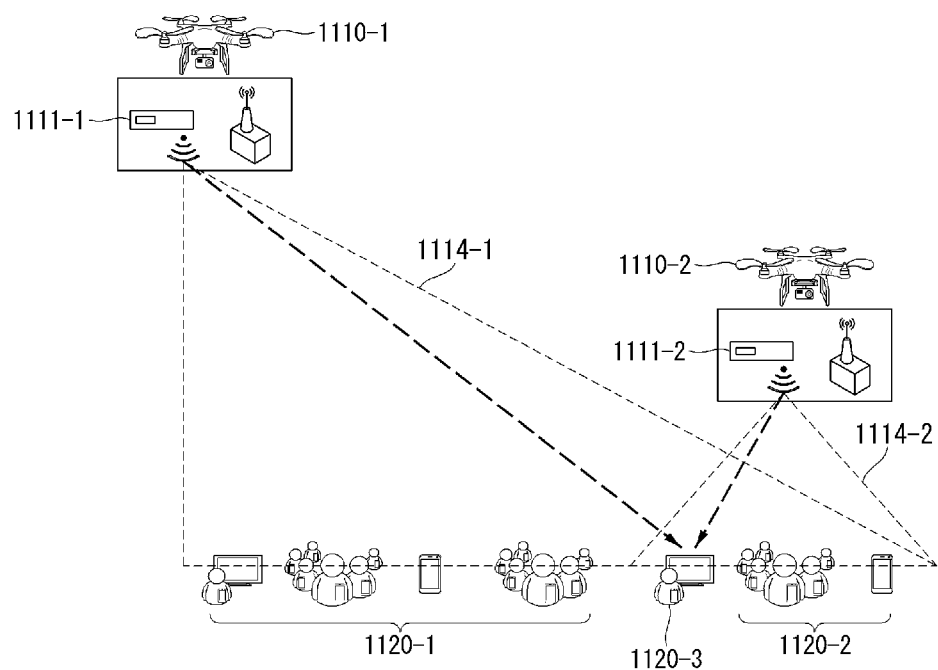
FIG. 11 is a conceptual diagram illustrating a third exemplary embodiment of a procedure for a terminal to select a mobile base station by using an altitude indicator.

FIG. 11 is a conceptual diagram illustrating a third exemplary embodiment of a procedure for a terminal to select a mobile base station by using an altitude indicator.

Referring to FIG. 11, a first mobile base station 1110-1 may be located at a higher altitude, and may transmit to terminals 1120-1 to 1120-3 an altitude indicator set to 0. Then, the terminals 1120-1 to 1120-3 may receive the altitude indicator set to 0 from the first mobile base station 1110-1. Accordingly, the terminals 1120-1 to 1120-3 may identify the altitude indicator, may identify that the altitude of the first mobile base station 1110-1 is higher than the altitude reference because the altitude indicator is set to 0, and may identify that the first mobile base station 1110-1 has a wide first cell coverage 1114-1.

On the other hand, a second mobile base station 1110-2 may be located at a lower altitude that the first mobile base station 1110-1, and since the altitude is lower than the altitude reference, the second mobile base station 1110-2 may transmit to the terminals 1120-1 to 1120-3 an altitude indicator set to 1. Accordingly, the terminals 1120-1 to 1120-3 may identify the altitude indicator, may identify that the altitude of the second mobile base station 1110-2 is lower than the altitude reference because the altitude indicator is set to 1, and may identify that the second mobile base station 1110-2 has a second cell coverage 1114-2 narrower than has the first cell coverage 1114-1.

As described above, the terminals 1120-1 to 1120-3 may identify the altitudes of the first mobile base station 1110-1 and the second mobile base station 1110-2, and may determine that the altitude of the first mobile base station 1110-1 is higher than the altitude of the second mobile base station 1110-2. In addition, each of the terminals 1120-1 to 1120-3 may determine its own position and movement speed, and may select a mobile base station to be accessed from among the first mobile base station 1110-1 and the second mobile base station 1110-2 based on the determined position and movement speed.

For example, the first terminals 1120-1 may be carried by users located in the first cell coverage 1114-1, and may select the first mobile base station 1110-1 as a mobile base station to be accessed. In addition, the first terminals 1120-1 may access the selected first mobile base station 1110-1 and use communication services from the first mobile base station 1110-1. Alternatively, the second terminals 1120-2 may be carried by users located in the second cell coverage 1114-2, and may select the second mobile base station 1110-2 as a mobile base station to be accessed. In addition, the second terminals 1120-2 may access the selected second mobile base station 1110-2 and use communication services from the second mobile base station 1110-2.

Meanwhile, the third terminal 1120-3 may be carried by a user located in an area where the first cell coverage 1114-1 and the second cell coverage 1114-2 overlap each other. Accordingly, the third terminal 1120-3 may determine its position and movement speed and based on the determined position and movement speed, the third terminal 1120-3 may select a mobile base station to be accessed among from the first mobile base station 1110-1 and the second mobile base station 1110-2, and perform a procedure for accessing the selected mobile base station. As an example, when the identified position is in the area where the first cell coverage 1114-1 and the second cell coverage 1114-2 overlap and the movement speed of the third terminal 1120-3 is 3 kilometers or less per hour, the first mobile base station 1110-1 may be selected as a mobile base station to be accessed.

In addition, the third terminal 1120-3 may access the first mobile base station 1110-1 to use communication services from the first mobile base station 1110-1. In such the situation, the third terminal 1120-3 may receive high-quality communication services from the first mobile base station 1110-1. On the other hand, when the determined position is located in the area where the first cell coverage 1114-1 and the second cell coverage 1114-2 overlap, and the third terminal 1120-3 has a movement speed of 3 kilometers or less per hour, the second mobile base station 1110-2 may be selected as a mobile base station to be accessed. In addition, the third terminal 1120-3 may access the second mobile base station 1110-2 and use communication services from the second mobile base station 1110-2. In such the situation, the third terminal 1120-3 may receive high quality communication services from the second mobile base station 1110-2.

Figure 12:
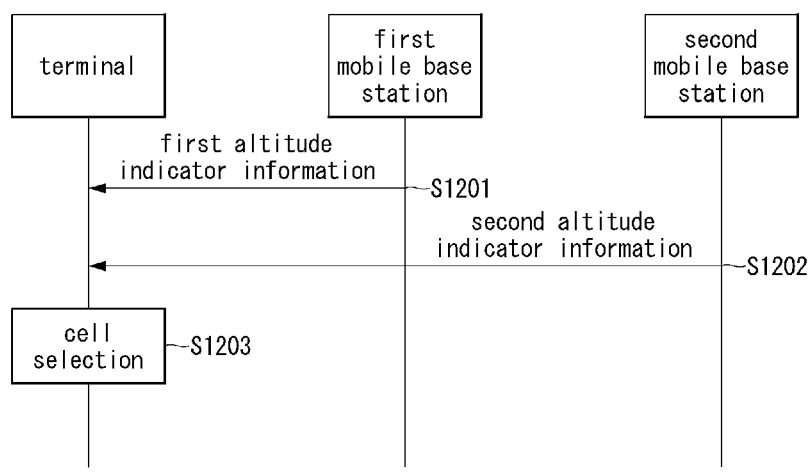
FIG. 12 is a sequence chart illustrating a first exemplary embodiment of a procedure for a terminal to select a mobile base station by using an altitude indicator.

FIG. 12 is a sequence chart illustrating a first exemplary embodiment of a procedure for a terminal to select a mobile base station by using an altitude indicator.

Referring to FIG. 12, a first mobile base station may be located at a higher altitude, and may transmit to a terminal an altitude indicator set to 0 (S1201). Then, the terminal may receive the altitude indicator set to 0 from the first mobile base station. Accordingly, the terminal may identify the altitude indicator, may identify that the altitude of the first mobile base station is higher than the altitude reference because the altitude indicator is set to 0, and may identify that the first mobile base station has a wide first cell coverage.

On the other hand, a second mobile base station may be located at a lower altitude than the first mobile base station, and since the altitude is lower than the altitude reference, the second mobile base station may set a second altitude indicator to 1. Them, the second mobile base station may transmit second altitude indicator information including the second altitude indicator to the terminal (S1202). Accordingly, the terminal may identify the second altitude indicator information, may identify that the altitude of the second mobile base station is lower than the altitude reference because the altitude indicator is set to 1, and may identify that the second mobile base station has the second cell coverage narrower than has the first cell coverage. As described above, the terminal may identify the altitudes of the first mobile base station and the second mobile base station, and may determine that the altitude of the first mobile base station is higher than the altitude of the second mobile base station. Then, the terminal may select a cell by using the first altitude indicator information of the first mobile base station and the second altitude indicator information of the second mobile base station (S1203). That is, the terminal may select a mobile base station to be accessed from among the first mobile base station and the second mobile base station by using the first altitude indicator information of the first mobile base station and the second altitude indicator information of the second mobile base station.

In this case, when the terminal identifies different altitude indicators from the first mobile base station and the second mobile base station, criteria for performing cell selection may be as follows. First, the terminal may be preconfigured with a specific altitude preference by a communication service provider. For example, a terminal of a patrol member performing patrol over a wide range may have preference on a high altitude. In this case, the altitude preference may be set by using the altitude indicator, and for example, the altitude preference may be on the altitude indicator set to 0.

Accordingly, the terminal of the patrol member performing patrol over a wide range may first access the first mobile base station that has transmitted the first altitude indicator set to 0. Second, a terminal without a specific altitude preference may select a mobile base station by using a movement history. The movement history of the terminal may include information on positions obtained using GPS and information on base stations that the terminal has previously accessed. As an example, the terminal may predict an expected movement range by using the movement history (e.g., information on positions obtained using GPS, information on base stations that the terminal has previously accessed, and/or the like).

In addition, when the predicted expected movement range is narrow, the terminal may be configured to access a mobile base station having an altitude lower than the altitude reference. That is, the terminal having a narrow predicted expected movement range may first access the second mobile base station that has transmitted the altitude indicator indicating that the altitude is lower than the altitude reference, i.e., transmitted the second altitude indicator set to 1. Finally, a terminal that does not have a specific altitude preference and does not have a movement history may preferentially access the first mobile base station having transmitted the first altitude indicator indicating that the altitude is higher than the altitude reference and being set to 0, i.e., the mobile base station having a wider cell coverage.

Meanwhile, referring again to FIG. 3, in the case of the mobile base stations 310-1 and 310-2, they may provide services at the same positions continuously until they return to charge their batteries. However, the positions of the mobile base stations 310-1 and 310-2 may be changed due to a command of the drone management device 350 or an occurrence of a weather situation, a disaster situation, or the like. In this process, the mobile base stations 310-1 and 310-2 may change their altitude indicators when the positions are changed above or below the preset altitude reference. For example, when the positions of the mobile base stations 310-1 and 310-2 are changed above the preset altitude reference, the altitude indicators may be changed from 1 to 0. On the other hand, for example, when the positions of the mobile base stations 310-1 and 310-2 are changed below the preset altitude reference, the altitude indicators may be changed from 0 to 1.

Figure 13:
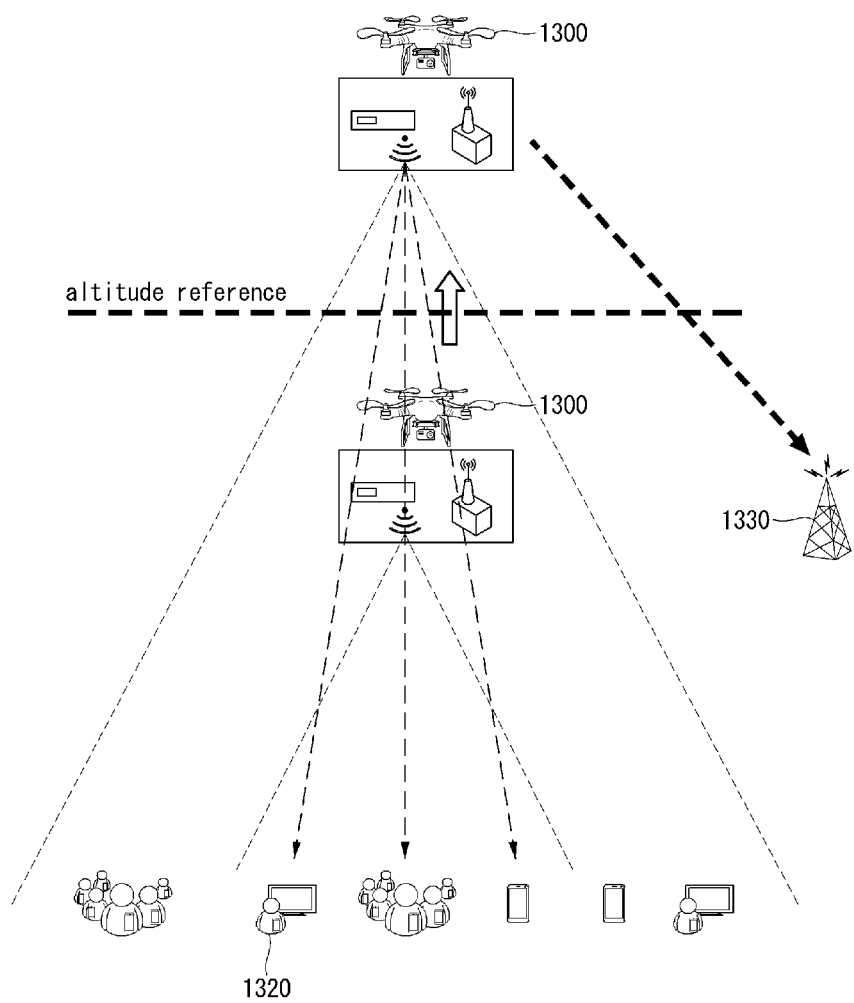
FIG. 13 is a conceptual diagram illustrating a first exemplary embodiment of a process of changing an altitude indicator according to a positional change of a mobile base station.

FIG. 13 is a conceptual diagram illustrating a first exemplary embodiment of a process of changing an altitude indicator according to a positional change of a mobile base station.

Referring to FIG. 13, when the position of the mobile base station 1300 is changed above the preset altitude reference, the altitude indicator may be changed from 1 to 0. Accordingly, the mobile base station 1300 may transmit information on the changed altitude indicator to the terminals 1320 and the mobile backhaul hub 1330. Then, the terminals 1320 and the mobile backhaul hub 1330 may receive the information on the changed altitude indicator from the mobile base station 1300. In addition, the terminals 1320 and the mobile backhaul hub 1330 may determine the altitude of the mobile base station 1300 from information on the changed altitude indicator received from the mobile base station 1300.

Figure 14:
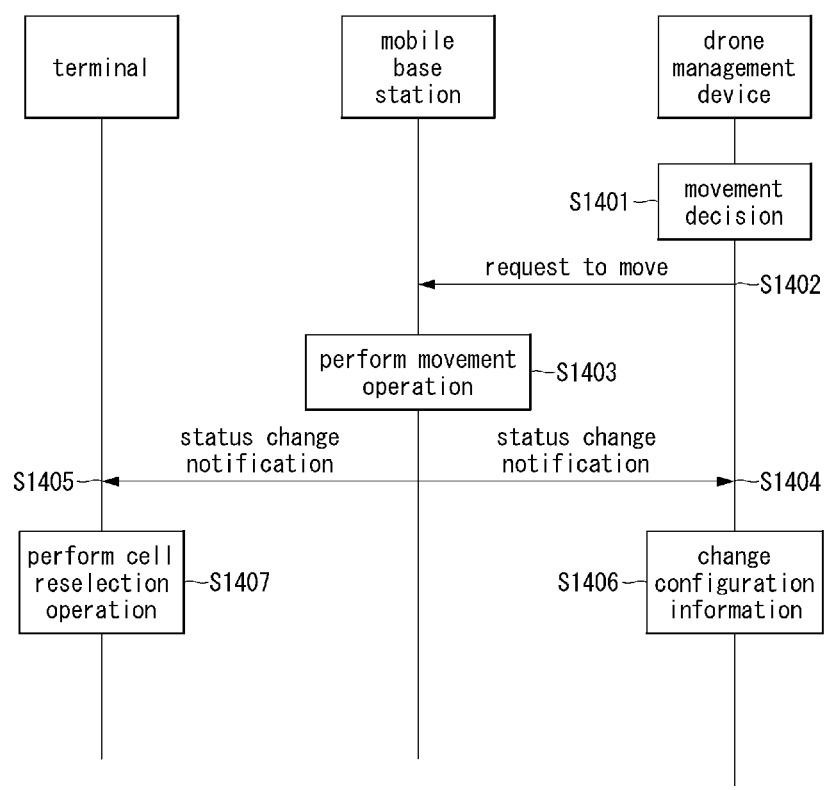
FIG. 14 is a sequence chart illustrating a first exemplary embodiment of an operation method according to a positional change of a mobile base station.

FIG. 14 is a sequence chart illustrating a first exemplary embodiment of an operation method according to a positional change of a mobile base station.

Referring to FIG. 14, the drone management device may determine movement of a mobile base station when it is necessary to raise or lower the altitude of the mobile base station (S1401). In addition, the drone management device may set a target altitude of the mobile base station, and may transmit the set target altitude to the mobile base station through a movement request signal (S1402). Then, the mobile base station may receive the target altitude from the drone management device, and may perform a movement operation to move to the received target altitude to adjust the current altitude (S1403).

Thereafter, the mobile base station may change the altitude indicator when the altitude is changed above or below the altitude reference. Then, the mobile base station may transmit the changed altitude indicator to the drone management device through a status change notification signal (S1404). Accordingly, the drone management device may receive the status change notification signal including the changed altitude indicator, and may change configuration information of the mobile base station by using the changed altitude indicator included in the received status change notification signal (S1406). On the other hand, the mobile base station may transmit the changed altitude indicator to the terminal through a status change notification signal (S1405). Accordingly, the terminal may receive the status change notification signal including the changed altitude indicator, and may perform a cell reselection operation by using the changed altitude indicator included in the received status change notification signal (S1407).

Here, the drone management device determines the movement of the mobile base station, but unlike this, the mobile base station may determine its movement by setting the target altitude as necessary. In this case, the mobile base station may adjust the current altitude by performing a movement operation to move to the target altitude. Thereafter, the mobile base station may change the altitude indicator when the altitude is changed above or below the altitude reference. In addition, the mobile base station may transmit the changed altitude indicator to the drone management device through a status change notification signal.

Accordingly, the drone management device may receive the status change notification signal including the changed altitude indicator, and may change configuration information of the mobile base station by using the changed altitude indicator included in the received status change notification signal. On the other hand, the mobile base station may transmit the changed altitude indicator to the terminal through a status change notification signal. Accordingly, the terminal may receive the status change notification signal including the changed altitude indicator. In addition, the terminal may perform a cell reselection operation by using the changed altitude indicator included in the received status change notification signal.

Here, although the mobile base station notifies the terminal of the status change after performing the movement operation, unlike this, the mobile base station may perform the status change notification to the terminal before performing the movement operation. Through this, the mobile base station may prevent deterioration of the communication performance that may occur in the process of moving to the target altitude, and may continuously maintain a quality of service for the terminal. After receiving the corresponding message from the mobile base station, the terminal may respond to the mobile base station when the operation is completed. Finally, the mobile base station may notify the drone management device that the positional change has been completed after performing the movement operation.

Figure 15:
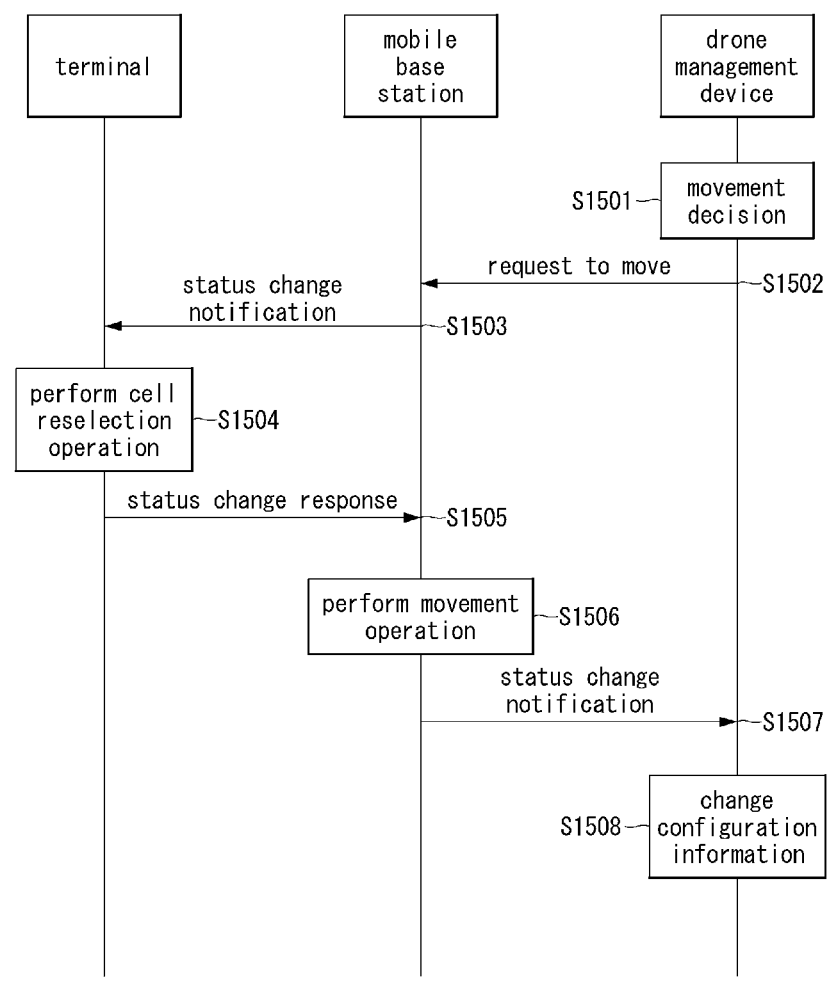
FIG. 15 is a sequence chart illustrating a second exemplary embodiment of an operation method according to a positional change of a mobile base station.

FIG. 15 is a sequence chart illustrating a second exemplary embodiment of an operation method according to a positional change of a mobile base station.

Referring to FIG. 15, the drone management apparatus may determine movement of a mobile base station when it is necessary to raise or lower the altitude of the mobile base station (S1501). In addition, the drone management device may set a target altitude of the mobile base station, and may transmit the set target altitude to the mobile base station through a movement request signal (S1502). Then, the mobile base station may receive the target altitude from the drone management device, and may determine whether the altitude indicator thereof is changed when a movement operation is performed according to the received target altitude. As a result of the determination, if it is needed to change the altitude indicator, the mobile base station may change the altitude indicator.

The mobile base station may transmit the changed altitude indicator to the terminal through a status change notification signal (S1503). Accordingly, the terminal may receive the status change notification signal including the changed altitude indicator. Then, the terminal may perform a cell reselection operation using the changed altitude indicator included in the received status change notification signal (S1504). Thereafter, the terminal may transmit a status change response signal to the mobile base station to inform the mobile base station that the cell reselection operation according to the changed altitude indicator has been completed (S1505).

Accordingly, the mobile base station may receive the status change response signal from the terminal, and may perform a movement operation according to the target altitude (S1506). Then, the mobile base station may transmit the changed altitude indicator to the drone management device through a status change notification signal (S1507). Accordingly, the drone management device may receive the status change notification signal including the changed altitude indicator, and may change configuration information of the mobile base station by using the changed altitude indicator included in the received status change notification signal (S1508).

Here, the drone management device determines the movement of the mobile base station, but unlike this, the mobile base station may determine the movement by the target altitude as necessary. In this case, when the mobile base station performs a movement operation due to the target altitude, the mobile base station may determine whether the altitude indicator is changed. As a result of the determination, the mobile base station may need to change the altitude indicator, and may change the altitude indicator. The mobile base station may transmit the changed altitude indicator to the terminal through a status change notification signal.

Accordingly, the terminal may receive the status change notification signal including the changed altitude indicator. In addition, the terminal may perform a cell reselection operation by using the changed altitude indicator included in the received status change notification signal. Thereafter, the terminal may transmit a status change response signal to the mobile base station to inform the mobile base station that the cell reselection operation according to the changed altitude indicator has been completed.

Accordingly, the mobile base station may receive the status change response signal from the terminal, and may perform a movement operation according to the target altitude. In addition, the mobile base station may transmit the changed altitude indicator to the drone management device through a status change notification signal. Accordingly, the drone management device may receive the status change notification signal including the changed altitude indicator, and may change configuration information of the mobile base station by using the changed altitude indicator included in the received status change notification signal.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method performed by a mobile base station in a communication system, the operation method comprising:
   obtaining altitude information;
   configuring altitude indicator information indicating whether the obtained altitude information is higher or lower than an altitude reference in cooperation with a drone management device based on the obtained altitude information; and
   transmitting the configured altitude indicator information to a terminal.

2. The operation method according to claim 1, wherein the configuring of the altitude indicator information comprises:
   requesting the altitude reference from the drone management device;
   receiving the altitude reference from the drone management device; and
   configuring the altitude indicator information by comparing the altitude information with the received altitude reference.

3. The operation method according to claim 1, wherein the configuring of the altitude indicator information comprises:
   transmitting an altitude indicator information request signal including the altitude information to the drone management device; and
   receiving the altitude indicator information from the drone management device.

4. The operation method according to claim 1, further comprising:
   receiving a target altitude from the drone management device;
   moving to meet the target altitude;
   changing the altitude indicator information according to the target altitude; and
   transmitting the changed altitude indicator information to the terminal.

5. The operation method according to claim 4, wherein the changing of the altitude indicator information comprises:
   determining whether a position of the mobile base station is changed above or below the altitude reference according to the moving to meet the target altitude; and
   changing the altitude indicator information when the position of the mobile base station is changed above or below the altitude reference.

6. An operation method performed by a terminal in a communication system, the operation method comprising:
   receiving first altitude indicator information from a first mobile base station;
   receiving second altitude indicator information from a second mobile base station;
   identifying a first altitude of the first mobile base station based on the first altitude indicator information;
   identifying a second altitude of the second mobile base station based on the second altitude indicator information;
   selecting one mobile base station among the first mobile base station and the second mobile base station based on the first altitude and the second altitude; and
   performing an operation for accessing the one mobile base station.

7. The operation method according to claim 6, wherein the first altitude indicator information indicates whether the first altitude is higher or lower than the altitude reference, and the second altitude indicator information indicates whether the second altitude is higher or lower than the altitude reference.

8. The operation method according to claim 6, wherein the selecting of the one mobile base station comprises:
   identifying a set altitude preference;
   selecting an altitude corresponding to the set altitude preference from among the first altitude and the second altitude; and
   selecting the one mobile base station corresponding to the selected altitude.

9. The operation method according to claim 6, wherein the selecting of the one mobile base station comprises:
   predicting an expected movement range using a movement history of the terminal, position information of the terminal, and information on mobile base stations that the terminal has previously accessed;
   selecting an altitude corresponding to the predicted expected movement range from among the first altitude and the second altitude; and
   selecting the one mobile base station corresponding to the selected altitude.

10. A terminal comprising;
    a processor;
    a memory electronically communicating with the processor; and
    instructions stored in the memory,
    wherein when executed by the processor, the instructions cause the terminal to:
    receive first altitude indicator information from a first mobile base station;
    receive second altitude indicator information from a second mobile base station;
    identify a first altitude of the first mobile base station based on the first altitude indicator information;
    identify a second altitude of the second mobile base station based on the second altitude indicator information;
    select one mobile base station among the first mobile base station and the second mobile base station based on the first altitude and the second altitude; and
    perform an operation for accessing the one mobile base station.

11. The terminal according to claim 10, wherein in the selecting of the one mobile base station, the instructions cause the terminal to:
    identify a set altitude preference;
    select an altitude corresponding to the set altitude preference from among the first altitude and the second altitude; and
    select the one mobile base station corresponding to the selected altitude.

12. The terminal according to claim 10, wherein in the selecting of the one mobile base station, the instructions cause the terminal to:
    predict an expected movement range using a movement history of the terminal, position information of the terminal, and information on mobile base stations that the terminal has previously accessed;
    select an altitude corresponding to the predicted expected movement range from among the first altitude and the second altitude; and
    select the one mobile base station corresponding to the selected altitude.

* * * * *